United States Patent [19]  [11]  4,110,256
Takeuchi et al.  [45]  Aug. 29, 1978

[54] CATALYST FOR REFORMING FUEL AND METHOD FOR PRODUCING SAME

[75] Inventors: Yukihisa Takeuchi, Aichi; Masao Wakayama, Okazaki, both of Japan

[73] Assignee: Nippon Soken, Inc., Japan

[21] Appl. No.: 805,439

[22] Filed: Jun. 10, 1977

[30] Foreign Application Priority Data

Jun. 22, 1976 [JP] Japan ................................. 51-73718
Jul. 15, 1976 [JP] Japan ................................. 51-84234

[51] Int. Cl.² .......................... B01J 21/04; B01J 23/72; B01J 23/86
[52] U.S. Cl. ................................ 252/465; 252/455 R; 252/462; 252/373; 423/654
[58] Field of Search .................... 252/373, 455 R, 462, 252/465; 423/654

[56] References Cited

U.S. PATENT DOCUMENTS 3,925,490 12/1975 Reich et al. ..................... 252/465 X
3,997,477 12/1976 Takeuchi ............................. 252/465

FOREIGN PATENT DOCUMENTS 4,945,067 2/1974 Japan ..................................... 252/465

Primary Examiner—W. J. Shine
Attorney, Agent, or Firm—Cushman, Darby & Cushman

[57] ABSTRACT

A catalyst for reforming fuel into a reformed gas rich in hydrogen comprises a catalyst carrier consisting of $\gamma$-$Al_2O_3$ and a catalyst metal mixture of the Cu—Ni—Cr type supported on the carrier, the metal mixture having the following composition: Cu = 36–62% by weight, Ni = 8–32% by weight, and Cr = 18–41% by weight, provided that Cu + Ni + Cr = 100% by weight. This catalyst is effective in reforming a fuel, especially methyl alcohol, into hydrogen over a wide temperature range from a low temperature to a high temperature. It is further improved by impregnating the carrier with at least one metal oxide selected from BaO, $La_2O_3$, $SiO_2$, $CeO_2$, and SrO or by admixing the catalyst metal mixture with at least one of the oxides.

16 Claims, 5 Drawing Figures

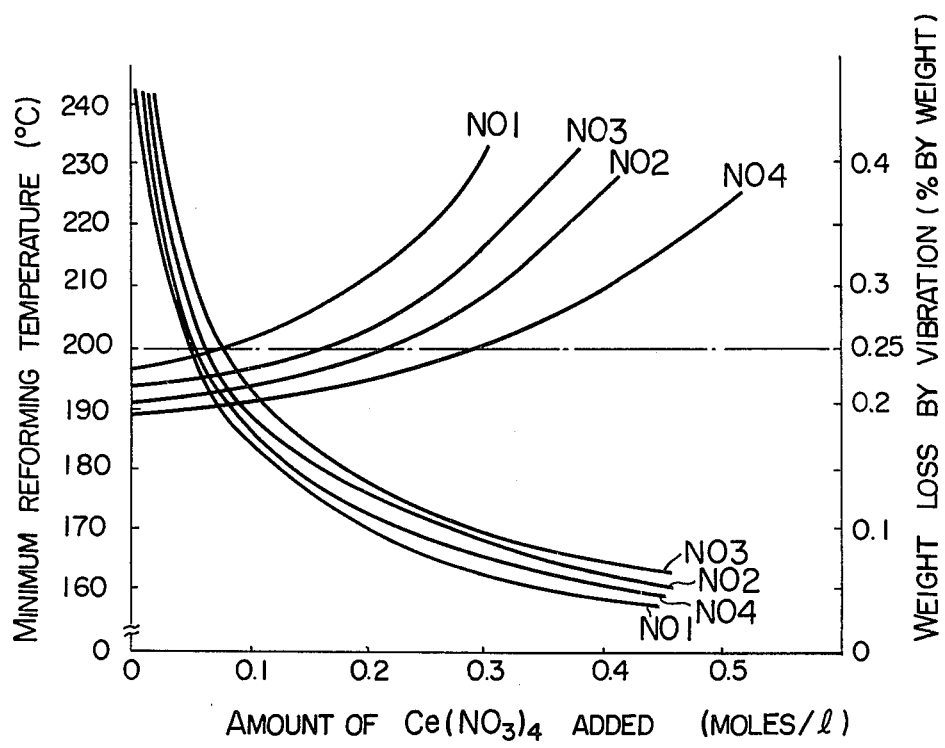
F I G. 5

CATALYST FOR REFORMING FUEL AND METHOD FOR PRODUCING SAME

This invention relates to a reforming catalyst for use in reforming fuels such as methyl alcohol, ethyl alcohol, and the like into a reformed gas mixture rich in hydrogen and carbon monoxide and also to a method for producing same.

It has been known that one of the means to reduce the amounts of carbon monoxide, hydrocarbons, and nitrogen oxides, which are principal harmful pollutants contained in the exhaust gas of an automotive internal combustion engine, is to run the engine with a fuel-air mixture at a small fuel-air ratio and to add to the mixture hydrogen in order to make such a dilute fuel-air mixture steadily combustible. One of the methods to supply hydrogen is to decompose a fuel such as, for example, methyl alcohol by utilizing the sensible heat of exhaust gas from an internal combustion engine. Since the temperature of exhaust gas from an internal combustion engine, as known well, varies within a wide range of from a temperature near room temperature to about 800° C, it is necessary to use an efficient catalyst capable of reforming the alcohol over a wide temperature range of from 200° to 800° C.

For the above purpose, there has been used heretofore a catalyst comprising copper (hereinafter referred to as Cu) and/or nickel (hereinafter referred to as Ni) supported, under a hydrogen atmosphere, on γ-alumina (hereinafter referred to as γ-$Al_2O_3$). Although when freshly prepared, the conventional Cu catalyst or the like is capable of satisfactorily reforming methyl alcohol over a relatively wide temperature range, yet it poses, after having been used at about 700° C for over 100 hours, a problem of deterioration in performance with respect to the temperature range in which methyl alcohol is sufficiently reformed, as compared with the fresh catalyst.

The present inventors conducted extensive studies to solve the above problem and found that although a Cu catalyst comprising Cu supported on γ-$Al_2O_3$ has a property which permits of sufficiently reforming methyl alcohol at a temperature higher than 200° C, yet it retained its thermostability up to only 600° C at highest and, hence, the lowest temperature for reforming methyl alcohol becomes higher with the time of reforming, as compared with the fresh catalyst. To the contrary, in the case of a Ni catalyst comprising Ni supported on γ-$Al_2O_3$ it was found that the lowest temperature at which methyl alcohol is sufficiently decomposed is as high as 450° C, but it retains thermostability up to about 950° C. A Cu-Ni catalyst comprising a mixture of Cu and Ni supported on γ-$Al_2O_3$ was found to retain its effectiveness for over 200 hours in reforming methyl alcohol at a temperature in the range of from 250° to about 800° C. However, this catalyst is still unsatisfactory in its range of operable temperature, because the target range is from 200° to 800° C.

As mentioned above, conventional catalysts for reforming fuels comprising Cu and/or Ni supported on a carrier such as γ-$Al_2O_3$ or the like has a disadvantage in that they are unable to exhibit sufficient reforming performance even at a high temperature.

On the other hand, when a well-known catalyst comprising Cu supported on γ-$Al_2O_3$ is used at a temperature as high as 700° C for, for example, over 100 hours, γ-$Al_2O_3$ begins to transform gradually into γ-$Al_2O_3$ with an accompanying change in the crystal structure of a part of γ-$Al_2O_3$, resulting in reduced interatomic bond strength and, hence, reduced physical strength of the catalyst which renders the catalyst susceptible to abrasion due to vibration. Moreover, with the progress of transformation into γ-$Al_2O_3$, the active surface of γ-$Al_2O_3$ is decreased and the catalytically active surface of Cu is also decreased owing to sintering of Cu particles by heat, together causing the lowest temperature of reforming methyl alcohol to shift toward a higher temperature region. Thus, the conventional Cu catalyst is inferior in resistances to heat and abrasion due to vibration. A conventional Cu—Ni catalyst also presents a problem similar to that of Cu catalyst, although it is somewhat superior to the Cu catalyst in thermostability.

Therefore, an object of this invention is to provide a fuel reforming catalyst having no disadvantage mentioned above and which is operable at a temperature as high as 800° C for a long period of time and, moreover, capable of satisfactorily reforming a fuel, particularly methyl alcohol, over a wide temperature range of from a lowest temperature of 200° C to a highest temperature of 800° C. This object is achieved by supporting on a catalyst carrier such as, for example, γ-$Al_2O_3$ a catalyst metal mixture of the Cu—Ni—Cr type comprising 36 to 62% by weight of Cu, 8 to 32% by weight of Ni, and 18 to 41% by weight of Cr, the total sum of metals being 100% by weight.

Another object of this invention is to provide a fuel reforming catalyst capable of satisfactorily reforming a fuel at a relatively low temperature of about 200° C. This object is achieved by supporting on a catalyst carrier such as γ-$Al_2O_3$ or the like 16% by weight or more (based on the weight of catalyst carrier) of a catalyst metal mixture of the above-noted composition.

A still another object of this invention is to provide a catalyst carrier which is improved so that the change in crystal structure of the principal component of the carrier, particularly γ-$Al_2O_3$, exposed to a high temperature may be suppressed to the utmost in order to keep the carrier such as γ-$Al_2O_3$ or the like from accompanying deterioration in physical strength and in active surface. This object is achieved by impregnating or coating the catalyst carrier (γ-$Al_2O_3$) with at least one metal oxide selected from silicon oxide ($SiO_2$), strontium oxide (SrO), cerium oxide ($CeO_2$), lanthanum oxide ($La_2O_3$) and barium oxide (BaO).

A further object of this invention is to provide a fuel reforming catalyst excellent in thermostability and resistance to abrasion due to vibration, which, when exposed to a high temperature, is kept from shifting of the lowest reforming temperature of methanol toward a high temperature region as well as from deterioration in physical strength and resistance to abrasion caused by vibration or the like. This object is achieved by supporting on a catalyst carrier such as γ-$Al_2O_3$ or the like a composition comprising a catalyst metal mixture of the Cu—Ni—Cr type and at least one metal oxide selected from silicon oxide ($SiO_2$), strontium oxide (SrO), cerium oxide ($CeO_2$), lanthanum oxide ($La_2O_3$), and barium oxide (BaO).

The invention will be understood more readily with reference to the following examples. However, these examples are intended to illustrate the invention and are not to be construed to limit the scope of the invention.

FIG. 5 is characteristic diagrams of catalysts comprising mixtures of CuO—NiO—Cr₂O₃ and CeO₂ supported on a carrier of γ-Al₂O₃, representing the changes in lowest reforming temperature and weight loss, after the catalysts have been subjected to vibration test under application of heat, as functions of the amount of Ce(NO₃)₄ added [Ce(NO₃)₄ was used as precursor of CeO₂].

The invention is illustrated below with reference to Examples.

EXAMPLE 1

Eleven solutions were prepared by using $Cu(NO_3)_2 \cdot 6H_2O$, $Ni(NO_3)_2 \cdot 6H_2O$, and $Cr(NO_3)_3 \cdot 9H_2O$ in proportions shown in Table 1. A carrier of granular γ-Al₂O₃ (10 m²/g in surface area) was immersed in each of the above solutions for 20 to 30 minutes, then dried at 100° to 180° C for about 1 to 2 hours, and calcined at 500° to 600° C for 60 to 120 minutes. On repeating the above procedure (from immersion to calcination) once more, CuO, NiO, and Cr₂O₃ were supported on the carrier of γ-Al₂O₃, and then reduced to Cu, Ni, and Cr, respectively, with hydrogen at about 200° C for 0.5 to 1.5 hours to obtain a Cu—Ni—Cr catalyst. Each of the catalysts thus prepared was evaluated for thermostability by heating in an electric furnace at 800° C for 24 hours and thereafter measuring the lowest reforming temperature of methyl alcohol. The results obtained were as shown in Table 1.

As is understandable from Table 1, catalysts which showed, after having been subjected to the tests for thermostability, a lowest methyl alcohol reforming temperature of 200° C or lower were Nos. 8, 9, 10, and 11, while the lowest reforming temperature of methyl alcohol for fresh catalysts before the thermostability test was 200° C. From these results, it is seen that the catalysts of Nos. 8, 9, 10, and 11 are capable of reforming methyl alcohol over a temperature range of from 200° to 800° C.

Figure 1:
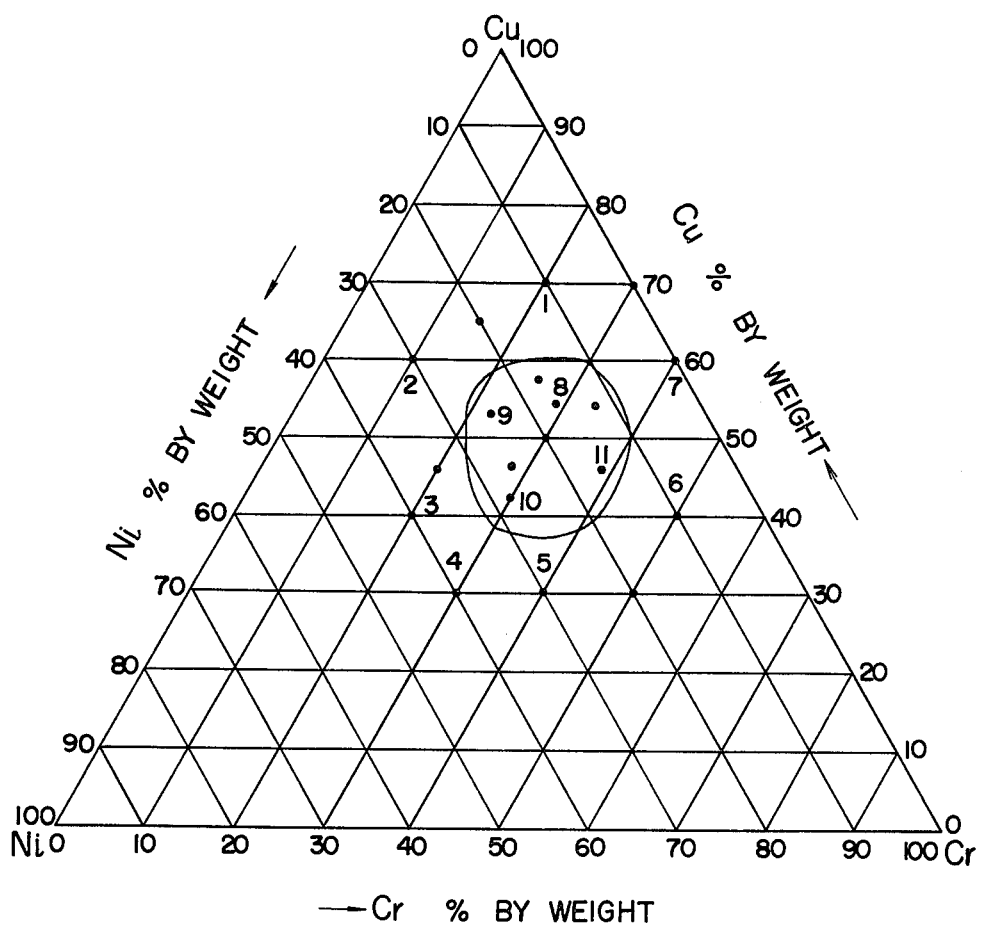
FIG. 1 is a characteristic diagram of a catalyst of the Cu—Ni—Cr type, which shows the area of Cu—Ni- —Cr composition where the lowest reforming temperature of methanol is 200° C or lower.

In FIG. 1 is shown the range of composition wherein the catalyst exhibits a lowest methyl alcohol reforming temperature of 200° C. The area enclosed in a curved line corresponds to the above range. The notations given in FIG. 1 correspond to the numbers assigned to the catalysts. On examination of the results shown in Table 1 and FIG. 1, it was found that the Cu—Ni—Cr catalysts capable of reforming methyl alcohol over a temperature range of from 200° to 800° C have the following composition: 36 to 62% by weight of Cu, 8 to 32% by weight of Ni, and 18 to 41% by weight of Cr, the total sum being 100% by weight. In order to obtain the above metal composition, the concentrations of metal salts in 1 liter of water are:

$Cu(NO_3)_2 \cdot 6H_2O$: 0.57 to 0.98 mole/liter,
$Ni(NO_3)_2 \cdot 6H_2O$: 0.14 to 0.55 mole/liter,
$Cr(NO_3)_3 \cdot 9H_2O$: 0.34 to 0.79 mole/liter.

EXAMPLE 2

Figure 2:
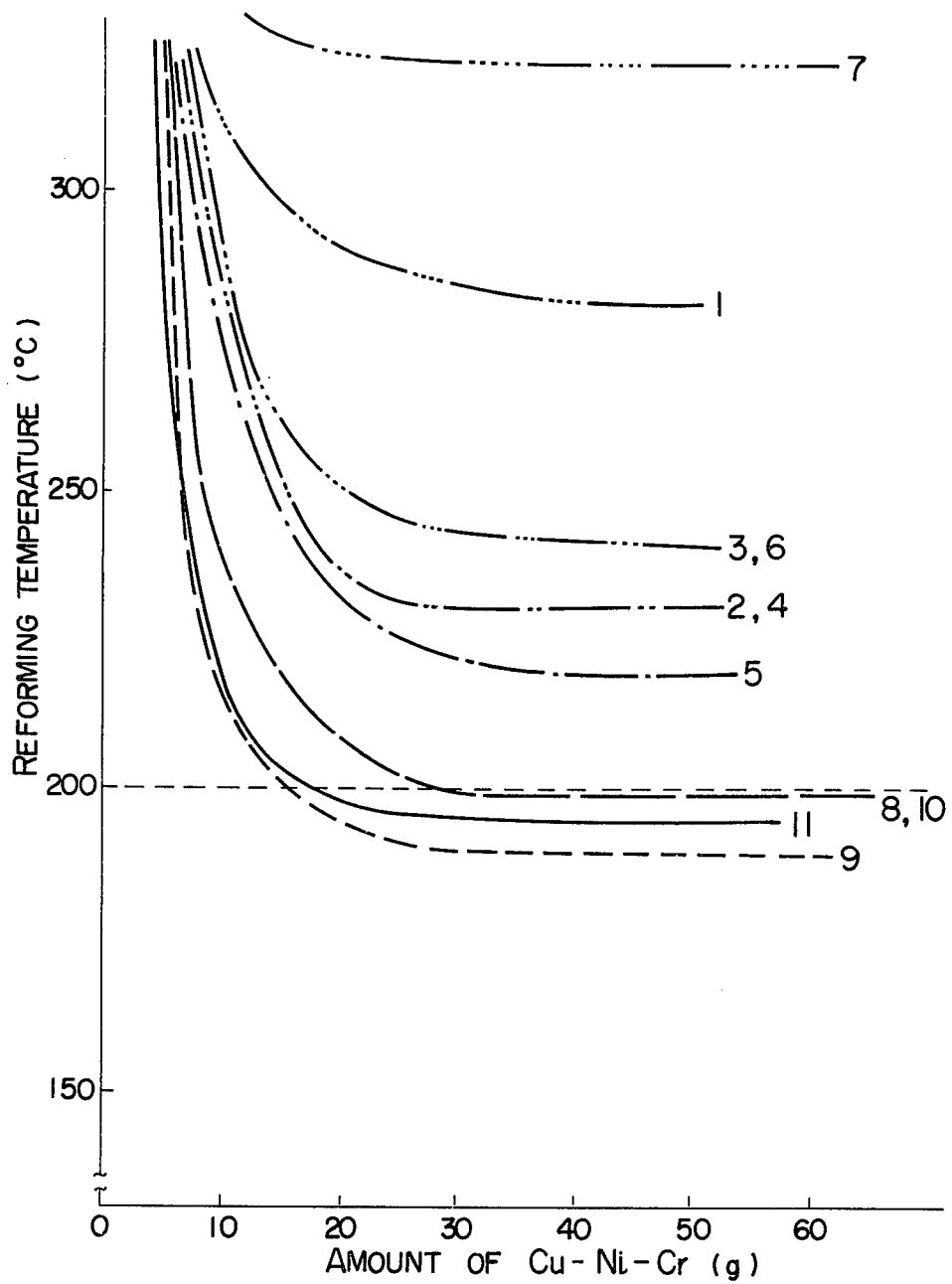
FIG. 2 is characteristic diagrams representing the relationship between the amount of catalyst metal mixture of the Cu—Ni—Cr type supported on γ-Al₂O₃ carrier and the methyl alcohol reforming temperature.

The present inventors examined the relationships between the amount of Cu—Ni—Cr catalyst metals supported on the γ-Al₂O₃ carrier and the lowest methyl alcohol reforming temperature after the durability tests performed in Example 1. The results of examination were as shown in FIG. 2, wherein the ordinate indicates the lowest methyl alcohol reforming temperature and the abscissa indicates the amount in gram of catalyst metals supported on 100 g of γ-Al₂O₃ carrier. The numbers given to the curves in FIG. 2 correspond to those assigned to the catalysts in Table 1. As regards the catalysts Nos. 8, 9, 10 and 11 which showed lowest reforming temperatures below 200° C in Table 1, the necessary amount of Cu—Ni—Cr catalyst metal mixtures to be supported on 100 g of the γ-Al₂O₃ carrier in order to achieve a lowest reforming temperature of 200° C is 28 g or more (28% by weight or more based on the weight of the γ-Al₂O₃ carrier) for the catalysts No. 8 and No. 10 and about 16 g or more for the catalysts No. 9 and No. 11. It was confirmed as mentioned above that the necessary amount of Cu—Ni—Cr catalyst metal mixture to be supported on 100 g of the γ-Al₂O₃ carrier was 16 g or more (16% by weight or more based on the weight of the carrier) even for the catalyst having a catalyst metal composition selected from the following ranges in order to achieve the reforming temperature range of from 200° to 800° C: 36 to 62% by weight of Table 1

| | % by weight | | | Amount added to 1 liter of water, mole | | | Lowest reforming temperature, °C |
|---|---|---|---|---|---|---|---|
| No. | Cu | Ni | Cr | Cu(NO₃)₂·6H₂O | Ni(NO₃)₂·6H₂O | Cr(NO₃)₃·9H₂O | |
| 1 | 70 | 10 | 20 | 1.11 | 0.17 | 0.38 | 280 |
| 2 | 60 | 30 | 10 | 0.95 | 0.52 | 0.19 | 230 |
| 3 | 40 | 40 | 20 | 0.63 | 0.69 | 0.38 | 240 |
| 4 | 30 | 40 | 30 | 0.48 | 0.69 | 0.58 | 230 |
| 5 | 30 | 30 | 40 | 0.48 | 0.52 | 0.77 | 220 |
| 6 | 40 | 10 | 50 | 0.63 | 0.17 | 0.96 | 240 |
| 7 | 60 | 0 | 40 | 0.95 | 0 | 0.77 | 320 |
| 8 | 54 | 17 | 29 | 0.84 | 0.29 | 0.42 | 200 |
| 9 | 53 | 25 | 22 | 0.84 | 0.43 | 0.42 | 190 |
| 10 | 42 | 28 | 30 | 0.67 | 0.48 | 0.58 | 200 |
| 11 | 46 | 16 | 38 | 0.73 | 0.28 | 0.73 | 195 |

Cu, 8 to 32% by weight of Ni, and 18 to 41% by weight of Cr.

The methyl alcohol reforming reaction dealt with in the present invention proceeds according to the following formula:

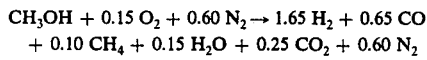

$$CH_3OH + 0.15\ O_2 + 0.60\ N_2 \rightarrow 1.65\ H_2 + 0.65\ CO$$
$$+ 0.10\ CH_4 + 0.15\ H_2O + 0.25\ CO_2 + 0.60\ N_2$$

The lowest reforming temperature as herein referred to is a lowest temperature at which about 1,570 cc of reformed gas excluding nitrogen is obtained from 1 cc of methyl alcohol.

EXAMPLE 3

In above Examples, the carrier used in the Cu—Ni—Cr catalysts was $\gamma$-$Al_2O_3$ having a large surface area and a high catalytic activity. However, as known well, $\gamma$-$Al_2O_3$ has a crystal transition point and transforms into $\gamma$-$Al_2O_3$ at about 900° C, resulting in reduced surface area which may affect markedly the lowest methyl alcohol reforming temperature. Therefore, it was necessary to find a carrier which will hardly vary in surface area even when the transformation into $\alpha$-$Al_2O_3$ takes place.

As a result of various experiments, the present inventors obtained a carrier by immersing $\gamma$-$Al_2O_3$ for 20 to 30 minutes in a solution containing in one liter of water 0.1 to 0.5 mole of at least one metal salt selected from nitrates of Ba, Sr, La, Ce, and Si, then drying at 100° to 120° C for 2 hours, and finally calcining at 600° to 900° C for 2 to 5 hours. The thus obtained carrier contained beside the major component, $\gamma$-$Al_2O_3$, at least one metal oxide selected from BaO, $La_2O_3$, $SiO_2$, $CeO_2$, and SrO which had been formed on calcination. This carrier was found to resist the surface area reduction associated with the transformation of $\gamma$-$Al_2O_3$ to $\alpha$-form, presumably because BaO, SrO, or the like served as a bonding material between particles of $\gamma$-$Al_2O_3$, although the exact reason was not yet made clear. When a catalyst metal composition, for example No. 10, in Table 1 of Example 1 was supported on the carrier obtained above and heated in an electric furnace at 900° C for 24 hours, the lowest reforming temperature was found to be about 205° C (200° C with a fresh catalyst), as contrasted to a lowest reforming temperature of about 300° C observed in another experiment conducted under comparable conditions using ordinary $\gamma$-$Al_2O_3$.

As mentioned above, in the present Example 3, $\gamma$-$Al_2O_3$ was immersed in a solution containing 0.1 to 0.5 mole of a metal salt in one liter of water. However, the concentration of a metal salt is not limited to the range given above but may be adequately determined by experiment.

In Example 3 given above, a carrier such as $\gamma$-$Al_2O_3$ was impregnated with at least one of the BaO, $La_2O_3$, $SiO_2$, CeO, and SrO and then the catalyst metal composition of the Cu—Ni—Cr type was supported thereon. It was shown that by such a treatment the antivibrational property of the carrier is improved and the lowest reforming temperature after the thermostability test is decreased, as compared with a catalyst prepared by using a carrier not containing the said metal oxide.

However, if evaluated on the necessary condition that after thermostability test, the lowest reforming temperature is 200° C or lower and the weight loss is 25% or less, the catalyst obtained in Example 3 was not yet satisfactory. Accordingly, the present inventors conducted various experiments in order to obtain a catalyst which satisfies the above condition and, as a result, found that a desirable catalyst may be obtained by supporting on a carrier such as $\gamma$-$Al_2O_3$ a catalyst metal composition of the Cu—Ni—Cr type together with at least one metal oxide selected from $SiO_2$, SrO, $CeO_2$, $La_2O_3$, and BaO. Such a catalyst is illustrated in the following Example.

EXAMPLE 4

Ethyl silicate [$Si(OC_2H_5)_4$] was added to each of the four solutions containing $Cu(NO_3)_2.6H_2O$, $Ni(NO_3)_2.6H_2O$, and $Cr(NO_3)_3.9H_2O$ in the proportions given in Table 2. A granulated carrier comprising $\gamma$-$Al_2O_3$ (10 $m^2$/g or more in surface area) was immersed in each of the resulting solutions for 20 to 30 minutes, then dried at 100° to 120° C for 2 hours, and calcined at 600° C for 2 hours to support a mixture of CuO—NiO—$Cr_2O_3$ and $SiO_2$ on the surface of $\gamma$-$Al_2O_3$.

Table 2

| | Composition of Cu-Ni-Cr | | | | | |
|---|---|---|---|---|---|---|
| | Amounts supported on $\gamma$-$Al_2O_3$ (% by wt. based on wt. of $\gamma$-$Al_2O_3$) | | | Amount added to 1 liter of water (mole) | | |
| No. | Cu | Ni | Cr | $Cu(NO_3)_2$ . $6H_2O$ | $Ni(NO_3)_2$ . $6H_2O$ | $Cr(NO_3)_3$ . $9H_2O$ |
| 1 | 54 | 17 | 29 | 0.84 | 0.29 | 0.42 |
| 2 | 53 | 25 | 22 | 0.84 | 0.43 | 0.42 |
| 3 | 42 | 23 | 30 | 0.67 | 0.48 | 0.58 |
| 4 | 46 | 16 | 38 | 0.73 | 0.28 | 0.73 |

Figure 3:
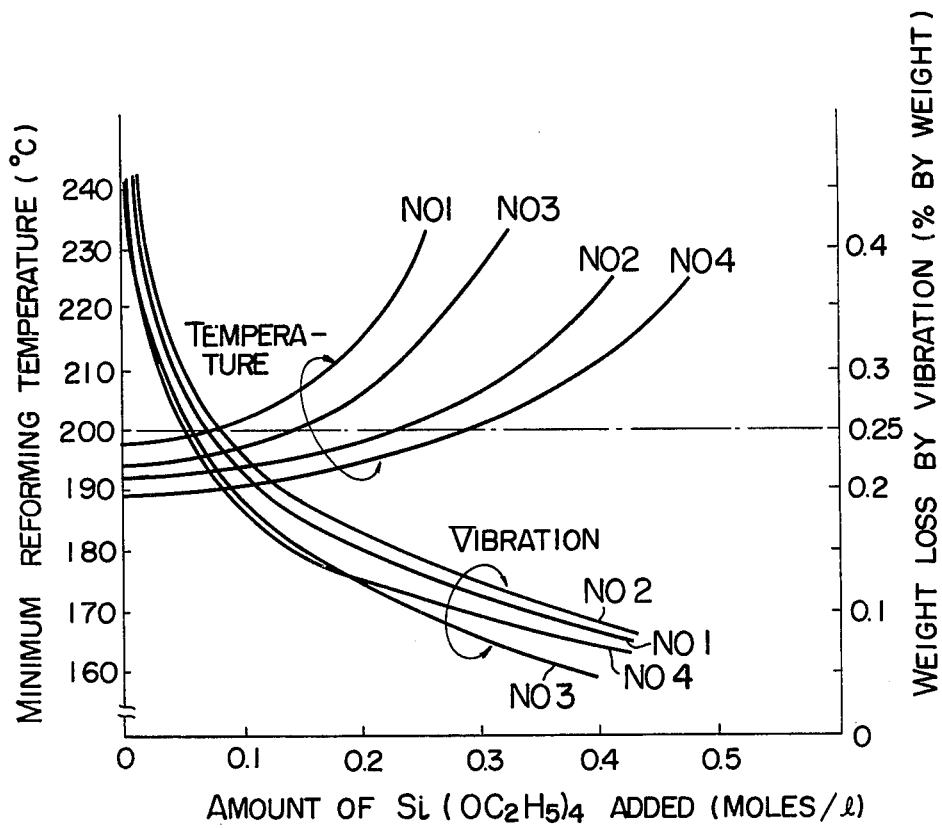
FIG. 3 is characteristic diagrams of four catalyst mixtures of CuO—NiO—Cr₂O₃ and SiO₂ supported on a carrier of γ-Al₂O₃, representing the changes in lowest reforming temperature and weight loss, after the catalysts have been subjected to vibration test under application of heat, as functions of the amount of Si(OC₂H₅)₄ added [Si(OC₂H₅)₄ was added as precursor of SiO₂].

The catalyst thus prepared was packed in a vessel to occupy 94% or more of the vessel volume and subjected to a high-temperature vibration test while being heated at 800° C under the following conditions: frequency of vibration, 10 to 200 Hz; acceleration, 10 to 15 G; period of time, 6 hours. After completion of the test, dependence of the weight loss of the catalyst and the lowest methyl alcohol reforming temperature on the amount of $Si(OC_2H_5)_4$ added was examined. The results obtained were as shown in FIG. 3. From FIG. 3, it is seen that on the necessary condition that in reforming methyl alcohol to feed fuel to an automotive internal combustion engine, the lowest reforming temperature is 200° C or lower and the weight loss due to vibration is 0.25% or less (corresponding to a traveled distance of about 50,000 km), a suitable amount to be added of $Si(OC_2H_5)_4$ is 0.07 mole/liter for No. 1 solution, 0.08 to 0.25 mole/liter for No. 2 solution, 0.06 to 0.14 mole/liter for No. 3 solution, and 0.05 to 0.3 mole/liter for No. 4 solution. It is also seen from FIG. 3 that with the increase in the amount of $Si(OC_2H_5)_4$ added, the weight loss by vibration decreases, while the lowest methyl alcohol reforming temperature increases. The fresh catalyst before the vibration test showed a lowest methyl alcohol reforming temperature of 200° C.

Since the CuO—NiO—$Cr_2O_3$—$SiO_2$ mixture supported on the surface of $\gamma$-$Al_2O_3$ is exposed to the reducing atmosphere of hydrogen liberated by the reforming of methyl alcohol, CuO and NiO are completely reduced to Cu and Ni, respectively, and $Cr_2O_3$ partly to Cr, while $SiO_2$ remains substantially unchanged. Since the catalytic activity manifested in reforming methyl alcohol is that of the Cu—Ni—Cr catalyst metals in metallic state, it is not always necessary to reduce the CuO—NiO—$Cr_2O_3$ mixture in preparing the catalyst, as was the case in Example 1. A catalyst is able to reform methyl alcohol at a temperature below 200° C so long as the CuO—NiO—Cr$_2$O$_3$ supported on γ-Al$_2$O$_3$ comprises, in terms of metal, 36 to 62% by weight of Cu, 8 to 32% by weight of Ni, and 18 to 41% by weight of Cr, the total sum being 100% by weight. Further, a catalyst containing SiO$_2$ is able to reform methyl alcohol at a temperature below 200° C and shows little weight loss by vibration, that is, little abrasion (strength is high), so long as the catalyst mixture comprises, in terms of metal, 33 to 59% by weight of Cu, 5 to 30% by weight of Ni, 15 to 39% by weight of Cr, and 1 to 10% by weight of Si, the total sum being 100% by weight. A suitable amount of the Cu—Ni—Cr—Si mixture to be supported is 0.16 to 0.40 g on 1 g of γ-Al$_2$O$_3$ (16 to 40% by weight based on the weight of γ-Al$_2$O$_3$). If the supported amount is below 0.16 g, the lowest methyl alcohol reforming temperature is increased and the strength becomes lower, while if the amount exceeds 0.40 g, the catalyst mixture tends to peel off the surface of γ-Al$_2$O$_3$.

COMPARATIVE EXAMPLE

The same granulated γ-Al$_2$O$_3$ as used in Example 4 was immersed in a solution containing 0.5 mole/liter or less of Si(OC$_2$H$_5$)$_4$ for 20 to 30 minutes, then dried at 100° to 120° for 2 hours, and calcined at 600° C for 2 hours to deposit SiO$_2$ on the surface of γ-Al$_2$O$_3$. The resulting γ-Al$_2$O$_3$ supporting SiO$_2$ was immersed for 20 to 30 minutes in one of the solutions No. 1 to No. 4 shown in Table 2 or Example 4, then dried at 100° to 120° C for 2 hours, and calcined at 600° C for 2 hours to support the CuO—NiO—Cr$_2$O$_3$ mixture on SiO$_2$ already deposited on the surface of γ-Al$_2$O$_3$.

Figure 4:
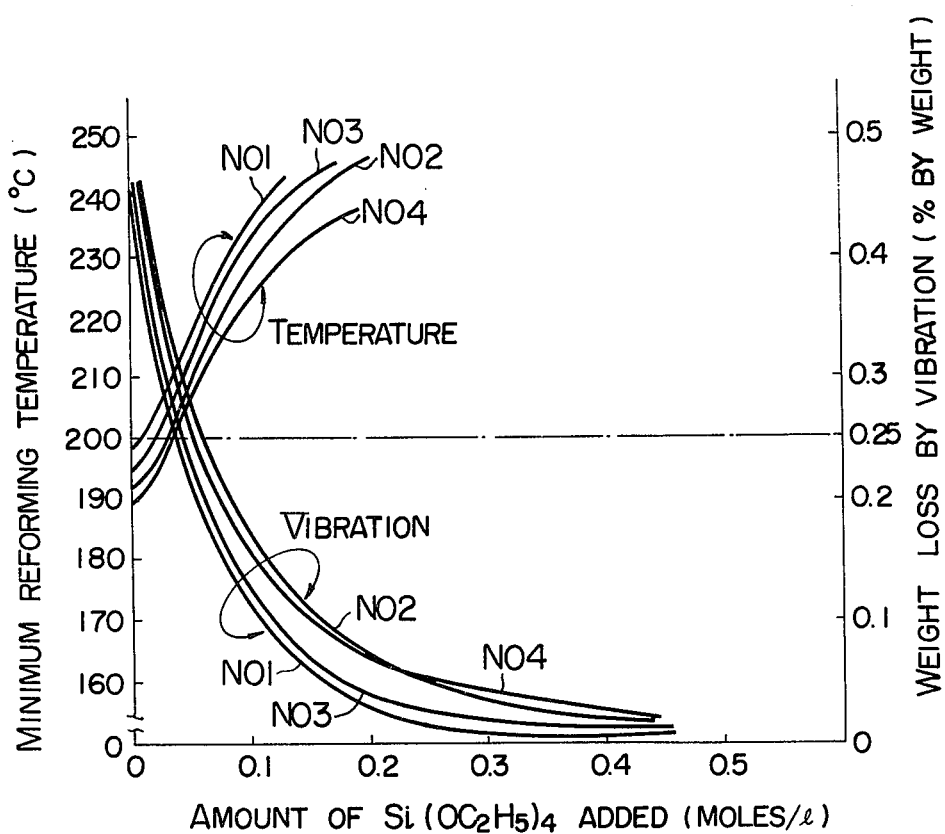
FIG. 4 is characteristic diagrams of catalysts prepared by supporting CuO—NiO—Cr₂O₃ on a carrier of γ-Al₂O₃ which has been impregnated with SiO₂ [in the form of its precursor, Si(OC₂H₅)₄], representing the changes in lowest reforming temperature and weight loss, after the catalysts have been subjected to vibration test under application of heat, as functions of the amount of Si(OC₂H₅)₄ added.

The catalyst thus obtained was subjected to a high-temperature vibration test as in Example 4. Dependence of the lowest methyl alcohol reforming temperature and weight loss by vibration after the vibration test on the amount of SiO$_2$ deposited on γ-Al$_2$O$_3$ was as shown in FIG. 4. As is seen from FIG. 4, a catalyst which showed a lowest reforming temperature of 200° C or lower and, at the same time, a weight loss of 0.25% by weight or less was not obtained, although the resistance against vibration was quite good. The reasons for this will become apparent from the following explanatory description:

The catalyst prepared in Example 4 contained SiO$_2$ in admixture with CuO—NiO—Cr$_2$O$_3$ supported on γ-Al$_2$O$_3$ and had a compressive strength of about 9 to 10 kg/cm$^2$ when 0.1 mole/liter of Si(OC$_2$H$_5$)$_4$ had been added, while it was 6 to 7 kg/cm$^2$ when no SiO$_2$ was contained. On the other hand, the catalyst of this Comparative Example showed a compressive strength of about 11 to 12 kg/cm$^2$ when 0.1 mole/liter of Si(OC$_2$H$_5$)$_4$ had been added. In this catalyst, since γ-Al$_2$O$_3$ was at first impregnated with Si(OC$_2$H$_5$)$_4$, a part of SiO$_2$ was deposited between granules of γ-Al$_2$O$_3$ and serves as intergranular bonding material (binder action), resulting in increased compressive strength. However, this increased compressive strength suggests that micropores of γ-Al$_2$O$_3$ have been blocked with deposited SiO$_2$, resulting in reduced active surface which leads to the rise in lowest reforming temperature. A relatively high compressive strength means favorable antivibrational characteristics.

EXAMPLE 5

Catalysts were prepared in the same manner as in Example 4 using the solutions No. 1 to No. 4 in Table 2, except that Ce(NO$_3$)$_4$ was used in place of the Si-(OC$_2$H$_5$)$_4$. The resulting catalysts comprising CuO—NiO—Cr$_2$O$_3$—CeO$_2$ supported on the surface of γ-Al$_2$O$_3$ were subjected to high-temperature vibration test in the same manner as in Example 4. The dependence of the lowest methyl alcohol reforming temperature and the weight loss after the said test on the amount added of Ce(NO$_3$)$_4$ was as shown in FIG. 5. It is seen from FIG. 5 that in order to meet the required lowest methyl alcohol reforming temperature of 200° C and the required weight loss by vibration of 0.25% by weight or less, the necessary amount to be added of Ce(NO$_3$)$_4$ is 0.05 to 0.08 mole/liter for the solution No. 1, 0.06 to 0.23 mole/liter for the solution No. 2, 0.07 to 0.17 mole/liter for the solution No. 3, and 0.06 to 0.3 mole/liter for the solution No. 4. The Ce(NO$_3$)$_4$ can be added in an amount of 0.05 to 0.3 mole per liter of water. It was impossible to attain a lowest methyl alcohol reforming temperature of 200° C or lower with a catalyst prepared by first supporting CeO$_2$ on γ-Al$_2$O$_3$ and then supporting thereon a CuO—NiO—Cr$_2$O$_3$ mixture.

The suitable composition of the CuO—NiO—Cr$_2$O$_3$—CeO$_2$ mixture to be supported on γ-Al$_2$O$_3$, in terms of metal, was 28 to 53% by weight of Cu, 3 to 24% by weight of Ni, 12 to 35% by weight of Cr, and 4 to 30% by weight of Ce, the total sum being 100% by weight. The suitable amount of the Cu—Ni—Cr—Ce mixture to be supported on γ-Al$_2$O$_3$ is 0.16 to 0.4 g for 1 g of γ-Al$_2$O$_3$ (16 to 40% by weight based on the weight of γ-Al$_2$O$_3$).

EXAMPLE 6

In the same manner as in Example 4, catalysts were prepared using the solutions No. 1 to No. 4 shown in Table 2, except that Sr(NO$_3$)$_2$.4H$_2$O was used in place of the Si(OC$_2$H$_5$)$_4$. The catalysts thus obtained and comprising CuO—NiO—Cr$_2$O$_3$—SrO supported on the surface of γ-Al$_2$O$_3$ were subjected to high-temperature vibration test in the same manner as in Example 4. On examination of the test results, it was found that in order to meet the requirements that after the said test the lowest methyl alcohol reforming temperature is 200° C or lower and the weight loss 0.25% by weight or less, the amount of Sr(NO$_3$)$_2$.4H$_2$O to be added to each of the solutions No. 1 to No. 4 is 0.05 to 0.08 mole/liter for the solution No. 1, 0.06 to 0.18 mole/liter for the solution No. 2, 0.07 to 0.15 mole/liter for the solution No. 3, and 0.06 to 0.23 mole/liter for the solution No. 4. The Sr(NO$_3$)$_2$.4H$_2$O can be added in an amount of 0.05 to 0.23 mole per liter of water. It was impossible to attain a lowest methyl alcohol reforming temperature of 200° C or lower with a catalyst prepared by first supporting SrO on γ-Al$_2$O$_3$ and then supporting thereon a CuO—NiO—Cr$_2$O$_3$ mixture.

The suitable composition of the CuO—NiO—Cr$_2$O$_3$—SrO mixture to be supported on γ-Al$_2$O$_3$, in terms of metal, was 30 to 57% by weight of Cu, 3 to 27% by weight of Ni, 14 to 38% by weight of Cr, and 3 to 23% by weight of Sr, the total sum being 100% by weight. The suitable amount of the Cu—Ni—Cr—Sr mixture to be supported on γ-Al$_2$O$_3$ was 0.16 to 0.43 g for 1 g of γ-Al$_2$O$_3$ (16 to 43% by weight based on the weight of γ-Al$_2$O$_3$).

EXAMPLE 7

In the same manner as in Example 4, catalysts were prepared using the solutions No. 1 to No. 4 in Table 2, except that La(NO$_3$)$_3$.6H$_2$O was used in place of the Si(OC$_2$H$_5$)$_4$. The thus obtained catalysts comprising CuO—NiO—Cr$_2$O$_3$—La$_2$O$_3$ supported on γ-Al$_2$O$_3$ were subjected to the high-temperature vibration test in the same manner as in Example 4. On examination of the test results, it was found that in order to meet the requirements that after the said test the lowest methyl alcohol reforming temperature is 200° C or lower and the weight loss by vibration 0.25% by weight or less, the amount of La(NO$_3$)$_3$.6H$_2$O to be added to each of the solutions is 0.06 to 0.10 mole/liter for the solution No. 2, 0.07 to 0.09 mole/liter for the solution No. 3, and 0.06 to 0.13 mole/liter for the solution No. 4. The solution No. 1 admixed with varied amounts of La(NO$_3$)$_3$.6H$_2$O failed to give a catalyst which meets the above requirements. It was also impossible to attain a lowest methyl alcohol reforming temperature of 200° C or lower with a catalyst prepared by first supporting La$_2$O$_3$ on γ-Al$_2$O$_3$ and then supporting thereon a CuO—NiO—Cr$_2$O$_3$ mixture.

The suitable composition of the CuO—NiO—Cr$_2$O$_3$—La$_2$O$_3$ mixture to be supported on γ-Al$_2$O$_3$, in terms of metal, was 31 to 59% by weight of Cu, 3 to 28% by weight of Ni, 14 to 39% by weight of Cr, and 3 to 22% by weight of La, the total sum being 100% by weight. The suitable amount of the Cu—Ni—Cr—La mixture to be supported on γ-Al$_2$O$_3$ was 0.16 to 0.42 g for 1 g of γ-Al$_2$O$_3$ (16 to 42% by weight based on the weight of γ-Al$_2$O$_3$).

EXAMPLE 8

In the same manner as in Example 4, catalysts were prepared using the solutions No. 1 to No. 4 in Table 2, except that Ba(NO$_3$)$_2$ was used in place of the Si(OC$_2$H$_5$)$_4$. The thus obtained catalysts comprising CuO—NiO—Cr$_2$O$_3$—BaO supported on the surface of γ-Al$_2$O$_3$ were subjected to the high-temperature vibration test in the same manner as in Example 4. On examination of the test results, it was found that in order to meet the requirements that after the said test the lowest methyl alcohol reforming temperature is 200° C or lower and the weight loss by vibration 0.25% by weight or less, the amount of Ba(NO$_3$)$_2$ to be added to the solution No. 4 is 0.07 to 0.09 mole/liter. The solutions No. 1, No. 2, and No. 3 admixed with varied amounts of Ba(NO$_3$)$_2$ failed to give catalysts which meet the above requirements. It was also impossible to attain a lowest methyl alcohol reforming temperature of 200° C or lower with a catalyst prepared by first supporting BaO on γ-Al$_2$O$_3$ and then supporting thereon a CuO—NiO—Cr$_2$O$_3$ mixture.

The suitable composition of the CuO—NiO—Cr$_2$O$_3$—BaO mixture to be supported on γ-Al$_2$O$_3$, in terms of metal, was 32 to 58% by weight of Cu, 5 to 29% by weight of Ni, 14 to 38% by weight of Cr, and 1 to 17% by weight of Ba, the total sum being 100% by weight. The suitable amount of the Cu—Ni—Cr—Ba mixture to be supported on γ-Al$_2$O$_3$ was 0.16 to 0.41 g for 1 g of γ-Al$_2$O$_3$ (16 to 41% by weight based on the weight of γ-Al$_2$O$_3$).

Although SiO$_2$, SrO, CeO$_2$, La$_2$O$_3$, and BaO were used each alone in the above Examples, two or more of these may be used in combination.

In the above Examples the catalysts were in granulated form, because granulated γ-Al$_2$O$_3$ was used as the carrier, but the form of the present catalyst is not limited to the granular form. It can be prepared in other forms such as, for example, a ceramic honeycomb form, in which γ-Al$_2$O$_3$ is coated on a substrate of the cordierite type, a metallic honeycomb form, in which γ-Al$_2$O$_3$ is flame-sprayed onto a metal surface, and a wire form prepared by coating a thin wire with γ-Al$_2$O$_3$.

What is claimed is:

1. A catalyst for reforming a fuel, comprising a catalyst carrier consisting essentially of γ-Al$_2$O$_3$ and a catalyst metal mixture containing Cu, Ni and Cr supported on said carrier, said catalyst metal mixture having the following composition:

Cu = 36–62% by weight,
Ni = 8–32% by weight, and
Cr = 18–41% by weight, provided that Cu + Ni + Cr = 100% by weight.

2. A catalyst for reforming a fuel as set forth in claim 1, wherein the amount of the catalyst metal mixture is 16% by weight or more based on the weight of catalyst carrier.

3. A catalyst for reforming a fuel as set forth in claim 1, wherein the catalyst carrier has deposited thereon at least one metal oxide selected from the group consisting of BaO, La$_2$O$_3$, SiO$_2$, CeO$_2$, and SrO.

4. A catalyst for reforming a fuel as set forth in claim 1, further comprising at least one metal oxide selected from the group consisting of BaO, La$_2$O$_3$, SiO$_2$, CeO$_2$, and SrO, said metal oxide being admixed with the catalyst metal mixture and supported on the catalyst carrier.

5. A catalyst for reforming a fuel as set forth in claim 4, wherein the total weight, in terms of metal, of the catalyst metal mixture and the metal oxide is 16% or more based on the weight of the catalyst carrier.

6. A catalyst for reforming a fuel as set forth in claim 4, wherein SiO$_2$ is selected as the metal oxide and the catalyst metals and SiO$_2$, in terms of metal, are present in the following proportions: Cu = 33 to 59% by weight, Ni = 5 to 30% by weight, Cr = 15 to 39% by weight, and Si = 1 to 10% by weight, provided that Cu + Ni + Cr + Si = 100% by weight.

7. A catalyst for reforming a fuel as set forth in claim 4, wherein CeO$_2$ is selected as the metal oxide and the catalyst metals and CeO$_2$, in terms of metal, are present in the following proportions: Cu = 28 to 53% by weight, Ni = 3 to 24% by weight, Cr = 12 to 35% by weight, and Ce = 4 to 30% by weight, provided that Cu + Ni + Cr + Ce = 100% by weight.

8. A catalyst for reforming a fuel as set forth in claim 4, wherein SrO is selected as the metal oxide and the catalyst metals and SrO, in terms of metal, are present in the following proportions: Cu = 30 to 57% by weight, Ni = 3 to 27% by weight, Cr = 14 to 38% by weight, and Sr = 3 to 23% by weight, provided that Cu + Ni + Cr + Sr = 100% by weight.

9. A catalyst for reforming a fuel as set forth in claim 4, wherein La$_2$O$_3$ is selected as the metal oxide and the catalyst metals and La$_2$O$_3$, in terms of metal, are present in the following proportions: Cu = 31 to 59% by weight, Ni = 3 to 28% by weight, Cr = 14 to 39% by weight, and La = 3 to 22% by weight, provided that Cu + Ni + Cr + La = 100% by weight.

10. A catalyst for reforming a fuel as set forth in claim 4, wherein BaO is selected as the metal oxide and the catalyst metals and BaO, in terms of metal, are present in the following proportions: Cu = 32 to 58% by weight, Ni = 5 to 29% by weight, Cr = 14 to 38% by weight, and Ba = 1 to 17% by weight, provided that Cu + Ni + Cr + Ba = 100% by weight.

11. A method for producing a catalyst for reforming a fuel, comprising the steps of:

preparing an aqueous solution containing 0.57 to 0.98 mole of Cu(NO$_3$)$_2$.6H$_2$O, 0.14 to 0.55 mole of Ni(-

$NO_3)_2 \cdot 6H_2O$, and 0.34 to 0.79 mole of $Cr(NO_3)_3 \cdot 9H_2O$ in one liter of water; immersing a catalyst carrier comprising $\gamma\text{-}Al_2O_3$ in said aqueous solution for 20 to 30 minutes; drying the immersed catalyst carrier at 100° to 120° C for 1 to 2 hours; and calcining the dried catalyst carrier at 500° to 600° C for 1 to 2 hours to support a $CuO\text{—}NiO\text{—}Cr_2O_3$ mixture on the catalyst carrier.

12. A method for producing a catalyst for reforming a fuel as set forth in claim 11, further comprising the step of adding 0.05 to 0.3 mole per liter of water of $Si(OC_2H_5)_4$ to the aqueous solution prior to the immersion of the catalyst carrier.

13. A method for producing a catalyst for reforming a fuel as set forth in claim 11, further comprising the step of adding 0.05 to 0.3 mole per liter of water of $Ce(NO_3)_4$ to the aqueous solution prior to the immersion of the catalyst carrier.

14. A method for producing a catalyst for reforming a fuel as set forth in claim 11, further comprising the step of adding 0.05 to 0.23 mole per liter of water of $Sr(NO_3)_2 \cdot 4H_2O$ to the aqueous solution prior to the immersion of the catalyst carrier.

15. A method for producing a catalyst for reforming a fuel as set forth in claim 11, further comprising the step of adding 0.06 to 0.13 mole per liter of water of $La(NO_3)_3 \cdot 6H_2O$ to the aqueous solution prior to the immersion of the catalyst carrier.

16. A method for producing a catalyst for reforming a fuel as set forth in claim 11, further comprising the step of adding 0.07 to 0.09 mole per liter of water of $Ba(NO_3)_2$ to the aqueous solution prior to the immersion of the catalyst carrier.

* * * * *